United States Patent
Pudenz

(10) Patent No.: US 9,582,694 B2
(45) Date of Patent: Feb. 28, 2017

(54) ANTENNA

(71) Applicant: SICK AG, Waldkirch (DE)

(72) Inventor: Florian Pudenz, Hamburg (DE)

(73) Assignee: SICK AG, Waldkirch (DE)

( * ) Notice: Subject to any disclaimer, the term of this patent is extended or adjusted under 35 U.S.C. 154(b) by 77 days.

(21) Appl. No.: 14/284,458

(22) Filed: May 22, 2014

(65) Prior Publication Data

US 2014/0354411 A1 Dec. 4, 2014

(30) Foreign Application Priority Data

Jun. 4, 2013 (EP) .................................. 13170516

(51) Int. Cl.
*H01Q 13/10* (2006.01)
*G06K 7/10* (2006.01)
*H01Q 1/22* (2006.01)
*H01Q 9/04* (2006.01)
*H01Q 13/16* (2006.01)

(52) U.S. Cl.
CPC ........ *G06K 7/10316* (2013.01); *H01Q 1/2216* (2013.01); *H01Q 9/0407* (2013.01); *H01Q 9/0435* (2013.01); *H01Q 9/0457* (2013.01); *H01Q 13/16* (2013.01)

(58) Field of Classification Search
CPC ........ H01Q 1/38; H01Q 13/10; H01Q 1/2216; H01Q 9/0407; H01Q 9/0435; H01Q 13/16
USPC .................................. 343/767, 700 MS, 771
See application file for complete search history.

(56) References Cited

U.S. PATENT DOCUMENTS

| | | | |
|---|---|---|---|
| 5,633,645 A * | 5/1997 | Day | H01Q 9/0457 343/700 MS |
| 6,897,809 B2 | 5/2005 | Carson et al. | |
| 2002/0175874 A1 | 11/2002 | Eason | |
| 2006/0132359 A1 | 6/2006 | Chang et al. | |
| 2006/0208901 A1* | 9/2006 | Kai | G06K 19/07749 340/572.7 |
| 2008/0309567 A1 | 12/2008 | Sabet et al. | |
| 2009/0213013 A1* | 8/2009 | Lindmark | H01Q 9/0457 343/700 MS |

FOREIGN PATENT DOCUMENTS

| | | |
|---|---|---|
| CN | 101976324 A | 2/2011 |
| JP | 5-199022 A | 8/1993 |
| JP | 7-7321 A | 1/1995 |
| JP | 08-056116 A | 2/1996 |

(Continued)

OTHER PUBLICATIONS

Targonski, S.D. et al ; "Design of Wideband Circularly Polarized Aperture-Coupled Microstrip Antennas". IEEE Transactions on Antennas and Propagation ; vol. 41, No. 2. (Feb. 1993) pp. 214-220.

(Continued)

*Primary Examiner* — Dieu H Duong
(74) *Attorney, Agent, or Firm* — Nath, Goldberg & Meyer; Jerald L. Meyer; Christopher Thomas

(57) ABSTRACT

An antenna (18), in particular a patch antenna for an RFID reading apparatus (10), having a circuit board (24) which has at least one slot (26) and a contact (28) at the slot (26) for feeding and/or picking up an electromagnetic signal. In this respect, the slot (26) is folded into itself and so forms a two-dimensional pattern on the circuit board (24).

15 Claims, 3 Drawing Sheets

(56) References Cited

FOREIGN PATENT DOCUMENTS

Figure 1:
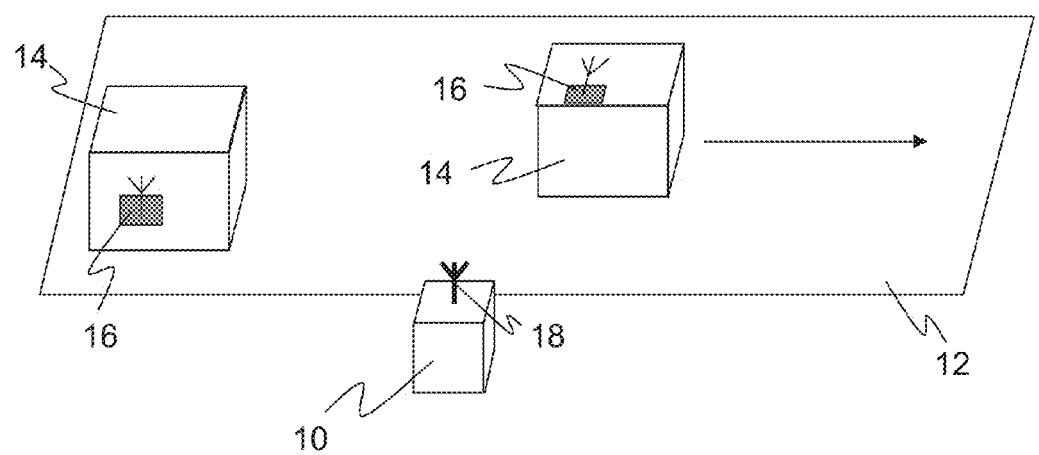

| JP | 9-74312 A | 3/1997 |
|---|---|---|
| JP | 2682737 B2 | 8/1997 |
| JP | 2008-53816 A | 3/2008 |
| JP | 2011-87296 A | 4/2011 |
| WO | 02065581 A1 | 8/2002 |
| WO | 2010036955 A1 | 4/2010 |

OTHER PUBLICATIONS

Popugaev, A.E. et al ; "A Novel Miniaturization Technique in Microstrip Feed Network Design". Fraunhofer Institute for Integrated Circuits ; EuCAP 2009, 3rd European Conference on Antennas and Propagation, Mar. 23-27, 2009, Berlin, ISBN 978-3-8008-3152-7 pp. 2309-2313. Conference information taken from specification pp. 4.
Search Report dated Nov. 22, 2013 for corresponding EP application No. 13170516.2.
Pozar, D.M. ; "A Review of Aperture Coupled Microstrip Antennas: History, Operation, Development, and Applications", Electrical and and Computer Engineering, University of Massachusetts at Amherst, Amherst, MA 01003, May 1996.

* cited by examiner

ANTENNA

The invention relates to an antenna having a circuit board and a slot in accordance with the preamble of claim 1 as well as to a corresponding method for transmitting and/or receiving electromagnetic signals.

Such an antenna is required, for example, in an RFID (radio frequency identification) reading system. Such RFID reading systems serve for the identification of objects and products and are used inter alia to automate logistical movements. RFID transponders fastened to the products are read out at an identification point, above all on a change of the owner of the product or on a change of the transport means, and information is optionally written back into the transponder. This results in fast and traceable logistical movements. The detected information is used to control the forwarding and sorting of goods and products. Important applications for automatic identification are logistical distribution centers, for instance of package shippers, or the baggage check-in at airports.

A frequent deployment site of an RFID reading system is the installation at a conveyor belt on which the goods are conveyed or in a so-called reading portal. Any desired passageway is to be understood by this which is equipped with one or more RFID readers and possibly with further sensors. Objects are moved through the reading portal by means of a conveyor belt, by means of a transport vehicle such as a forklift, or also manually and are identified in so doing with reference to their RFID transponder.

RFID transponders can be active in principle, that is can have their own energy supply, or can be of passive design. Independently of whether they are active or passive components, RFID transponders which operate in accordance with the backscatter principle are characterized in that they reflect the transmitted signal of the reading apparatus and in so doing change it by modulation in amplitude. They do not produce any radio frequency signal of their own in so doing. In practice, however, active transponders are less suitable for logistics because the unit prices for such transponders cannot reach the low level required for the mass market due to the energy supply. Passive transponders without their own energy supply are therefore usually used. In both cases, the transponder is excited to radiate the stored information by electromagnetic radiation of the reading apparatus, with passive transponders taking the required energy from the transmission energy of the reading system. In the established ultra-high frequency (UHF) standard ISO 18000-6, passive transponders are read out using the backscatter process.

Since a large proportion of the available transponders have linear polarization and since the orientation of the transponder with respect to the antenna of the reading apparatus cannot be unambiguously defined in a number of applications, antennas with circular polarization are preferably used for use in RFID reading apparatus.

So that a device such as an RFID reading system which transmits and receives electromagnetic waves can have a design which is as compact as possible, there is a demand for correspondingly compact antennas. The required antenna size in this respect depends on the frequency. This is in turn not a free parameter since, for example, a frequency range between 850 MHz and 950 MHz is provided for UHF, within which range frequencies can be used which are determined for specific countries.

Antennas based on microstrips are known in the prior art which are fed by means of a capacitive coupling via a slot. Such antennas are presented, for example, in the article by David Pozar, "A Review of Aperture Coupled Microstrip Antennas: History, Operation, Development, and Applications", Electrical and Computer Engineering, University of Massachusetts at Amherst, Amherst, Mass. 01003, May 1996. In this respect, however, straight, elongated slots are always provided which limit the possible miniaturization of the antenna.

WO 02/065581 A1 shows a layered patch antenna having three layers. The middle layer has a slot in the vicinity of a feed line. In further embodiments, two mutually orthogonal or intersecting slots are provided to transmit or receive mutually decoupled horizontally and vertically polarized signals or a circularly polarized signal. However, the slots here are also straight and elongated in all embodiments.

A compact antenna system having at least one patch element is described in U.S. Pat. No. 6,897,809 B2. Slots are provided in a circuit board for coupling the antenna signal between a patch and a feed line. These slots are likewise elongated, but can have circular enlarged portions at the ends ("dogbone shape"). The miniaturization is again limited by the elongated shape of the slots.

The article by Alexander Pogugaev et al., "A Novel Miniaturization Technique in Microstrip Feed Network Design", EuCAP 2009, 3rd European Conference on Antennas and Propagation, 23-27 Mar. 2009, Berlin, ISBN 978-3-8008-3152-7, proposes a network in microstrip technology is proposed for the feed of an antenna, with the network being formed by an array of ring segments. However, this article does not deal with a coupling via slots.

It is therefore the object of the invention to find an antenna shape which is as compact as possible.

This object is satisfied by an antenna having a circuit board and a slot in accordance with claim 1 as well as by a corresponding method for transmitting and/or receiving electromagnetic signals. In this respect, the invention starts from the basic idea of folding the slot for coupling the antenna signal. The required slot length namely increases with the wavelength of the signal to be transmitted since it approximately corresponds to half the wavelength of the desired resonant frequency. It becomes possible by the folding to accommodate the slot on a board having smaller dimensions with the same effective length. The slot structure as a whole can therefore have smaller outer dimensions than half the wavelength of the desired resonant frequency. Expressed again differently, a rectangle circumscribing the slot structure in accordance with the invention can be shorter and wider than a conventional slot configured as straight.

The invention thus has the advantage that the circuit board (also known as a main board) for coupling the antenna signal can remain particularly small. A very compact construction shape of the antenna is thereby made possible.

The antenna preferably has a planar resonator parallel to the circuit board. Such a resonator is usually called a patch and is a thin, conductive material layer, a metal as a rule, which is particularly suitable for integration on a board. The signal is capacitively coupled into the resonator by the contact via the slot or vice versa. The resonator can be provided on the circuit board or on its own board which can also be spaced apart from the circuit board by an additional air gap or by an additional dielectric. Although a purely slot radiator is conceivable as an antenna in principle, a resonator considerably improves the antenna properties.

The slot preferably has a plurality of arcs. This is a simple possibility to obtain the two-dimensional pattern by folding. Arcs avoid cracks or other irregularities which would impair the coupling.

A middle arc preferably has the greatest height and arcs at the sides have a smaller height as the distance from the middle arc increases. A middle arc of the greatest height also comprises the possibility of two highest middle arcs disposed next to one another. The height of the arcs preferably decreases uniformly. There is therefore a linearly falling bounding of the arcs. It is conceivable both that the arcs each end on a common base line and a kind of sinusoidal oscillation about the base line. The two-dimensional pattern formed by the arcs is preferably symmetrical with respect to its center axis.

The slot preferably has enlarged end points. The slots therefore open at their ends into openings, preferably circular openings, which are larger with respect to the width of the slot. Boundary effects are thus compensated and a uniform efficient coupling is achieved.

The circuit board preferably has two slots. These slots can be configured in all the described geometrical variants. Each slot has a contact for feeding and/or picking up an electromagnetic signal. The two slots are rotated with respect to one another, preferably at a right angle. Signals which are polarized transversely or orthogonally with respect to one another can be coupled in by such slots.

The two slots intersect one another in a preferred embodiment. This allows an even more effective surface utilization of the circuit board. The folds of the slots can be less pronounced or even not carried out at all in a region of mutual overlap so that the slots contact one another or come close to one another as little as possible.

The two slots preferably each have a contact which is formed by a microstrip. The feed therefore takes place in microstrip technology. An enlarged region can be provided at the end point of the contact. The contact preferably takes place at the center of the respective slot. If the latter has an arcuate structure, the microstrip preferably respectively ends in the middle arc of the associated slot with an elongated line region in parallel with the two flanks of the middle arc. Two independent signals having different linear polarizations can be fed in or a circularly polarized signal can be picked up via the two microstrips.

The microstrips preferably form a power divider. The fed signal is divided therein into two signal portions of equal amounts and phase-shifted by 90° with respect to one another for a circular polarization. This can be achieved by a corresponding geometrical design of the microstrips and saves a separate component for the power divider.

The microstrips are preferably folded into one another and so form a two-dimensional patters on the circuit board. The space requirements for the microstrips can be reduced by such a meandering structure.

The microstrips particularly preferably form the base shape of a rectangle which has a plurality of arcs at its sides. These arcs in particular have the same dimensions among one another.

The microstrips preferably form an inward dimple which is larger than the arcs at the narrow sides of the rectangle. The space requirements for the microstrips are therefore here not reduced simply by the arcs, but rather additionally the interior space of the rectangle is used.

In a preferred further development, an RFID reading apparatus having at least one antenna in accordance with the invention for transmitting RFID signals to an RFID transponder and/or for receiving RFID signals from an RFID transponder is provided, with the RFID reading apparatus furthermore having an evaluation unit for encoding RFID information into the RFID signals and/or for reading RFID information out of the RFID signals. The antenna allows a particularly compact construction shape of the RFID reading apparatus which continues to cover the required frequency band, for example in the UHF range. Such an RFID reading apparatus is preferably used in stationary installation at a reading zone of a conveyor or of a reading portal for reading out at least one RFID transponder moved on the conveyor or through the reading portal.

The method in accordance with the invention can be further developed in a similar manner and shows similar advantages in so doing. Such advantageous features are described in an exemplary, but not exclusive manner in the subordinate claims dependent on the independent claims.

Figure 2:
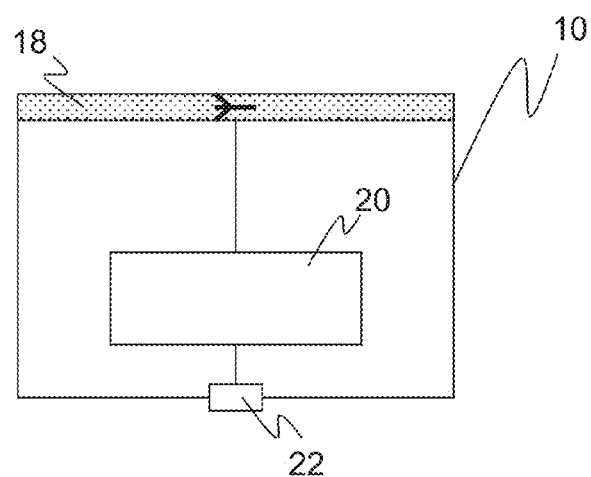
Figure 3:
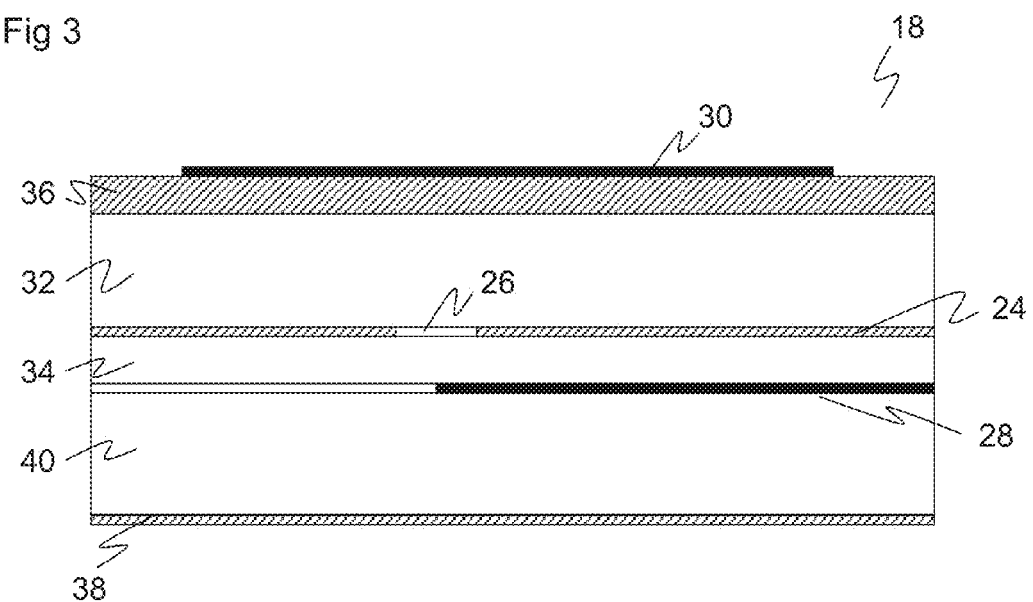
Figure 4:
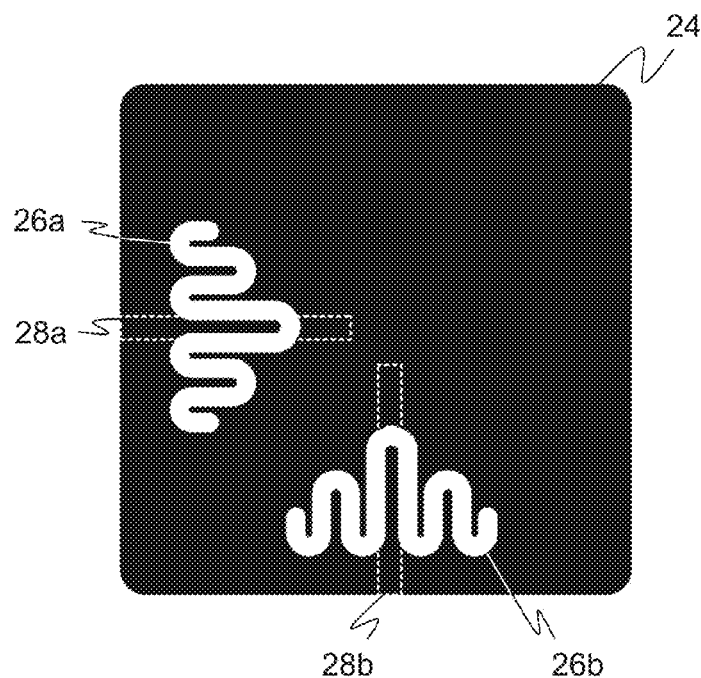
Figure 5:
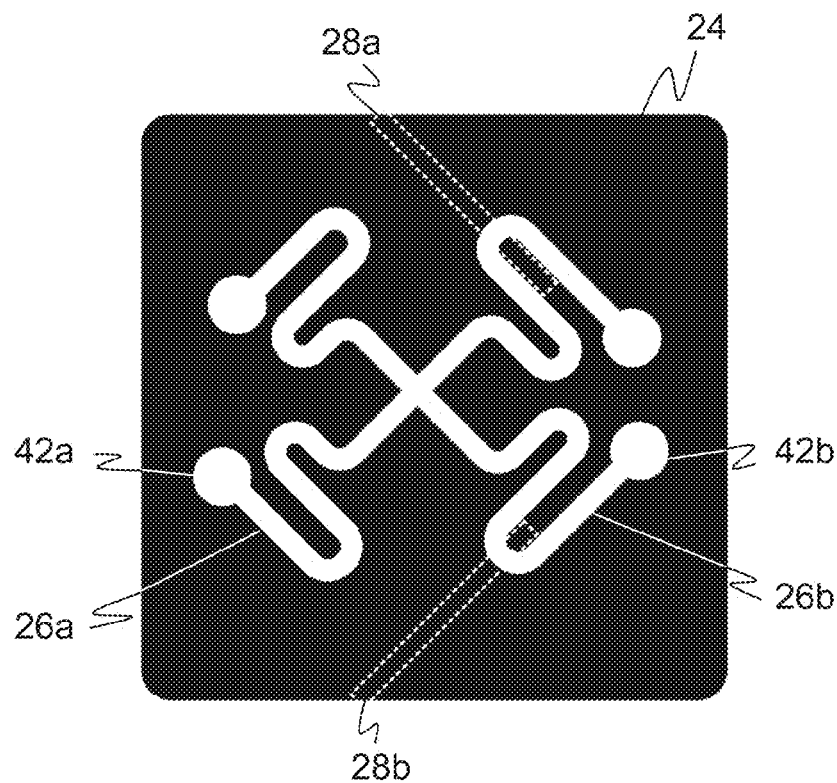
Figure 6:
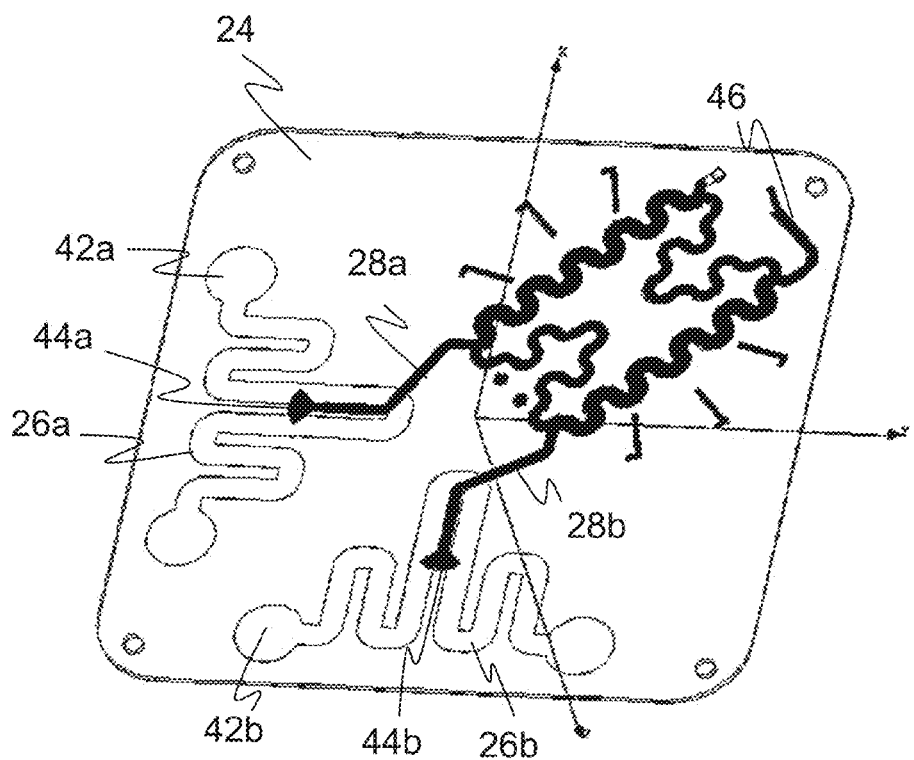

The invention will be explained in more detail in the following also with respect to further features and advantages by way of example with reference to embodiments and to the enclosed drawing. The Figures of the drawing show in:

FIG. 1 a schematic three-dimensional overview representation of the use of an RFID reader at a conveyor belt;

FIG. 2 a block diagram of an RFID reader;

FIG. 3 a schematic representation of the layer structure of an antenna;

FIG. 4 a plan view of a circuit board having a folded slot structure in an embodiment of the invention;

FIG. 5 a plan view of a circuit board having a folded slot structure in a further embodiment of the invention; and FIG. 6 a view from below of a circuit board having a folded slot structure on likewise folded feed lines which form a power divider.

FIG. 1 shows a schematic overview representation of an RFID reader 10 which is installed at a conveyor belt 12. Objects 14 which are provided with RFID transponders 16 are moved past the RFID reader 10 on the conveyor belt 12. It is the task of the RFID reader 10 to receive signals from the RFID transponders in order to read out information stored therein. Depending on the application, provision can conversely also be made that the RFID reader 10 stores information on an RFID transponder 16.

The RFID reader 10 has a reading/reception antenna 18 for receiving RFID signals for this purpose. The antenna 18 can additionally be used as a transmission antenna for writing processes on an RFID transponder 16 and for the supply of RFID transponders 16 with a carrier signal. Alternatively, a separate transmission antenna, not shown, is provided for this purpose. The more exact structure of an RFID reader 10 and of a transponder 16 as well as their communication between one another are known per se to the skilled person and will therefore not be explained in any more detail here.

FIG. 2 shows the RFID reader 10 in a very simplified block representation. A control and evaluation unit 20 of the RFID reader 10 is connected to the antenna 18 to evaluate RFID signals received by means of the antenna 18 or to transmit information to a transponder as RFID signals. The control and evaluation unit 20 is furthermore connected to a wired or wireless interface 22 to exchange data, to carry out parameterizations and the like.

The element improved with respect to known RFID readers 10 is the antenna 18 which is shown schematically in FIG. 2. The antenna 18 is preferably fed at two points to transmit circularly polarized waves. A circular polarization on feeding at only one or at more than two points can, however, also be realized. A corresponding antenna structure with only one feed point for linear polarization or with two feed points for different linear polarizations is also conceivable. For a simple manufacture, the antenna 18 is furthermore preferably configured as a patch antenna whose resonator is formed by a thin metal layer. The antenna 18 was introduced in connection with the example of an RFID reader 10, but can also be used in other devices.

FIG. 3 shows the layer structure of the antenna 18. In this respect, a plurality of layers are shown which do not necessarily all have to be present. In a minimal configuration, a circuit board 24 is, for example, composed of a substrate, also used for printed circuit boards, having a slot 26 with a feed line 28 arranged thereunder and without a termination, i.e. with an open end. With a suitable dimensioning, the slot 26 already acts as a radiating element or as an antenna.

To improve the bandwidth and the directive efficiency of the antenna 18, a planar resonator 30 of conductive material can be arranged above the slot 26, with the resonator 30 frequently being called a patch element and being matched to the desired resonant frequency of the antenna 18.

The intermediate spaces between the resonator 30 and the circuit board 24 as well as between the circuit board 24 and the feed line 28 can be formed by air gaps 32, 34 or by dielectrics 36. In this respect, all mixed forms are conceivable, that is only an air gap, only a dielectric or both, also in multilayer form, with different materials, for example in the form of a multilayer board.

A further board 38 can be utilized beneath the circuit board 24 to increase the directive efficiency of the antenna 18. The intermediate space between the feed line 28 and the further board 38 can be filled, like the other intermediate spaces, by an air gap 40 and/or by
a dielectric. The advantage of managing only with air gaps without any additional dielectrics is that no impairments of the bandwidth or changes to the resonant frequency of the antenna 18 occur due to tolerances in the dielectricity constant.

FIG. 4 shows a plan view of the circuit board 24 with two slots 26*a-b*. The associated feed lines 28*a-b* are located on the rear side of the circuit board 24 and are therefore shown in dashed lines. In this embodiment, the antenna can be excited in two planes to produce a circularly polarized signal or two signals linearly polarized orthogonally with respect to one another and decoupled from one another. In an alternative not shown, only one slot is provided with which a linearly polarized signal is then produced.

To accommodate slots 26*a-b* for a greater wavelength on a circuit board 24 which is as small as possible, for example for frequency ranges from 865-868 MHz or 902-928 MHz, the slots 26*a-b* are folded into themselves and so form a two-dimensional pattern. This pattern is configured in the form of a plurality of arcs by way of example in FIG. 4, with the middle arc having the largest height and the side arcs becoming smaller as the distance from the middle arc increases. The number of arcs, and equally their specific dimensions, is to be understood by way of example and is a variable of the antenna design in accordance with the desired resonant frequency. The slots 26*a-b* form a pattern which is symmetrical overall with respect to the center axis, with the feed lines 28*a-b* being arranged along the center axis. The arcs end on a common base line in the embodiment in accordance with FIG. 4. Alternatively, the arcs oscillate upwardly and downwardly about a base line. The slots 26*a-b* can furthermore open in widened end points differing from the representation.

FIG. 5 shows a plan view of the circuit board 24 in an alternative embodiment having two crossing slots 26*a-b*. This allows a compact accommodation of the two slots 26*a-b*, which, however, irrespective of the common point of intersection, practically continue to act like the two slots 26*a-b*. The arcuate structure is varied with respect to FIG. 4; on the one hand, to illustrate the possibilities of the folding of the slots 26*a-b* to form a two-dimensional pattern using a further example; on the other hand, to make the overlap possible at only one point. The slots 26*a-b* here open into optionally widened end points 42*a-b*, as was already explained as a possible embodiment with respect to FIG. 4.

FIG. 6 again shows the circuit board 24 with the slots 26*a-b* already known from FIG. 4, but now from the lower side to explain possible embodiments of the feed lines 28*a-b*. In the embodiment shown, the feed lines form a power divided configured in microstrip technology with whose aid a fed-in signal is split into two signal portions of equal amounts and phase-shifted by 90° with respect to one another. These signal portions then move toward the two open ends 44*a-b*. A total reflection of the signals would normally take place there. Since, however, the slots 26*a-b* are located as a resonant structure directly above the reflection point at the ends 44*a-b*, the signal is coupled to the resonator 30 arranged above. Since both slots 26*a-b* are still fed by signal portions offset by 90° with respect to one another, the resonator 30 radiates a circularly polarized wave overall.

In a similar manner to the slots 26*a-b*, the feed lines 28*a-b* are preferably folded into themselves and form a two-dimensional pattern. The space requirements for the feed lines 28*a-b* on the circuit board 24 can thereby be reduced by more than 60% in a frequency range around 900 MHz.

In the example shown, the folding again takes place with the aid of arcs which are of equal size among one another and are circular here. The feed lines 28*a-b* in this respect form the base shape of a rectangle whose sides are effectively substantially extended by arcs. In addition, an inward dimple is provided at the short sides of this rectangle and is likewise overlaid by arcs. The desired phase shift of the two signal portions is achieved by the different line lengths from the common contact point 46. An equal thickness of the feed lines 28*a-b* provides equal resistances and thus an equal power division. It must still be mentioned that the pins and eyes of the line structure not conductively connected do not have any technical significance.

The rectangle formed by the feed lines 28*a-b* has a 45° angle overall to the slots 28*a-b* and is arrange offset thereto on the circuit board 24. The existing surface of the circuit board 24 is thus ideally utilized without any mutual overlap, except at the desired contacts for coupling.

The antenna 18 thus shows a number of advantages. The two slots 26*a-b* are spatially decoupled within a plane and only take up a base area with considerably reduced outer dimensions due to the folding. Since both feed lines 28*a-b* lie in one plane, no additional intermediate layer in the form of an air gap or of a dielectric is required for their separation. The power divider and the feed lines 28*a-b* are combined on a substrate plane with a very small base area. The resonator 30 can also be configured for area reduction as a pattern, for example as a fold with a basic pattern or as a fractal. The antenna 18 thereby becomes even more compact.

The invention claimed is:

1. An antenna having a circuit board which has at least one slot and a contact at the slot for feeding and/or picking up an electromagnetic signal,
   wherein the slot is folded into itself and so forms a two-dimensional pattern on the circuit board;
   wherein the slot has a plurality of arcs;
   wherein the plurality of arcs comprise a middle arc having the largest height and side arcs having progressively smaller heights as a distance from the middle arc increases.

2. The antenna in accordance with claim 1, wherein the antenna is a patch antenna for an RFID reading apparatus.

3. The antenna in accordance with claim 1, further having a planar resonator in parallel with the circuit board.

4. The antenna in accordance with claim 1, wherein the slot has enlarged end points.

5. The antenna in accordance with claim 1, wherein the circuit board has two slots.

6. The antenna in accordance with claim 5, wherein the two slots intersect one another.

7. The antenna in accordance with claim 5, wherein the two slots each have a contact which is formed by a microstrip.

8. The antenna in accordance with claim 7, wherein the microstrips form a power divider.

9. The antenna in accordance with claim 7, wherein the microstrips are folded into themselves and so form a two-dimensional pattern on the circuit board.

10. The antenna in accordance with claim 7, wherein the microstrips form the base shape of a rectangle which has a plurality of arcs at its side.

11. The antenna in accordance with claim 7, wherein the microstrips form a dimple inwardly which is larger than the plurality of arcs at narrow sides of the rectangle.

12. An RFID reading apparatus having at least one antenna comprising a circuit board which has at least one slot and a contact at the slot for feeding and/or picking up an electromagnetic signal, with the slot being folded into itself and so forming a two-dimensional pattern on the circuit board; the antenna being suitable for transmitting RFID signals to an RFID transponder and/or for receiving RFID signals from an RFID transponder and the reading apparatus further having an evaluation unit for encoding RFID information into the RFID signals and/or for reading RFID information out of the RFID signals;

wherein the slot has a plurality of arcs;

wherein the plurality of arcs comprise a middle arc having the largest height and side arcs having progressively smaller heights as a distance from the middle arc increases.

13. The RFID reading apparatus in accordance with claim 12 for the stationary installation at one of a reading zone of a conveyor and of a reading portal for reading out at least one RFID transponder moved on the conveyor or through the reading portal.

14. A method of transmitting and/or receiving electromagnetic signals using an antenna having a circuit board which has at least one slot and a contact at the slot for feeding and/or picking up an electromagnetic signal, with the slot being folded into itself and so forming a two-dimensional pattern on the circuit board;

wherein the slot has a plurality of arcs;

wherein the plurality of arcs comprise a middle arc having the largest height and side arcs having progressively smaller heights as a distance from the middle arc increases.

15. The method in accordance with claim 14, which is adapted of transmitting and/or receiving RFID signals.

* * * * *